4 Sheets—Sheet 1.
J. T. WIBBERLEY.
SPOOL-WINDING MACHINE.
No. 187,498. Patented Feb. 20, 1877.
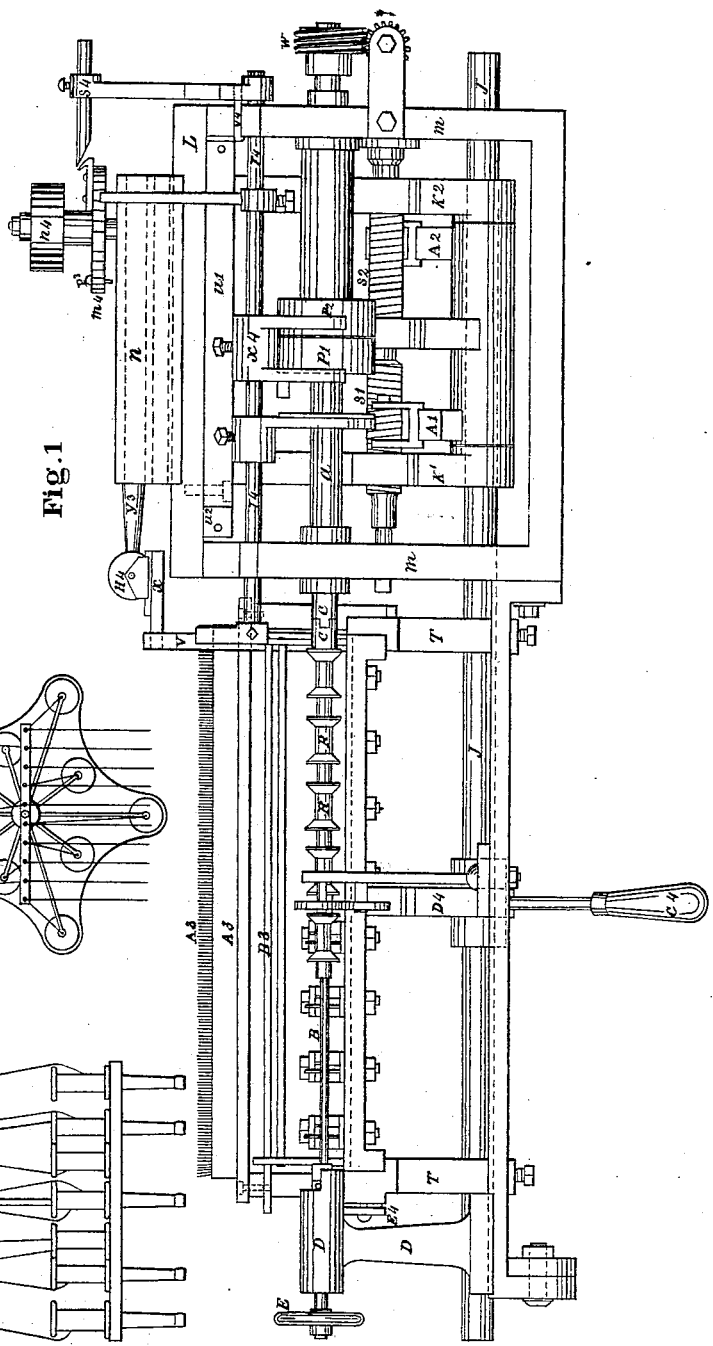
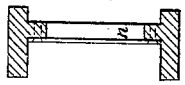
Fig. 17
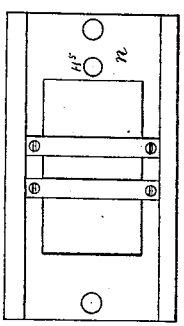
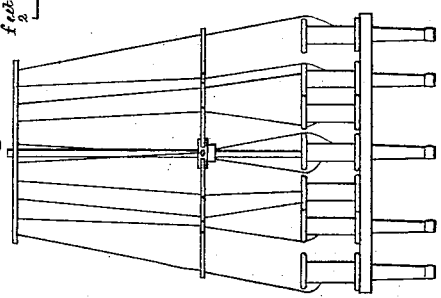
Witnesses
Abraham Manners,
Wm. S. Henson
Inventor
John Thomas Wibberley

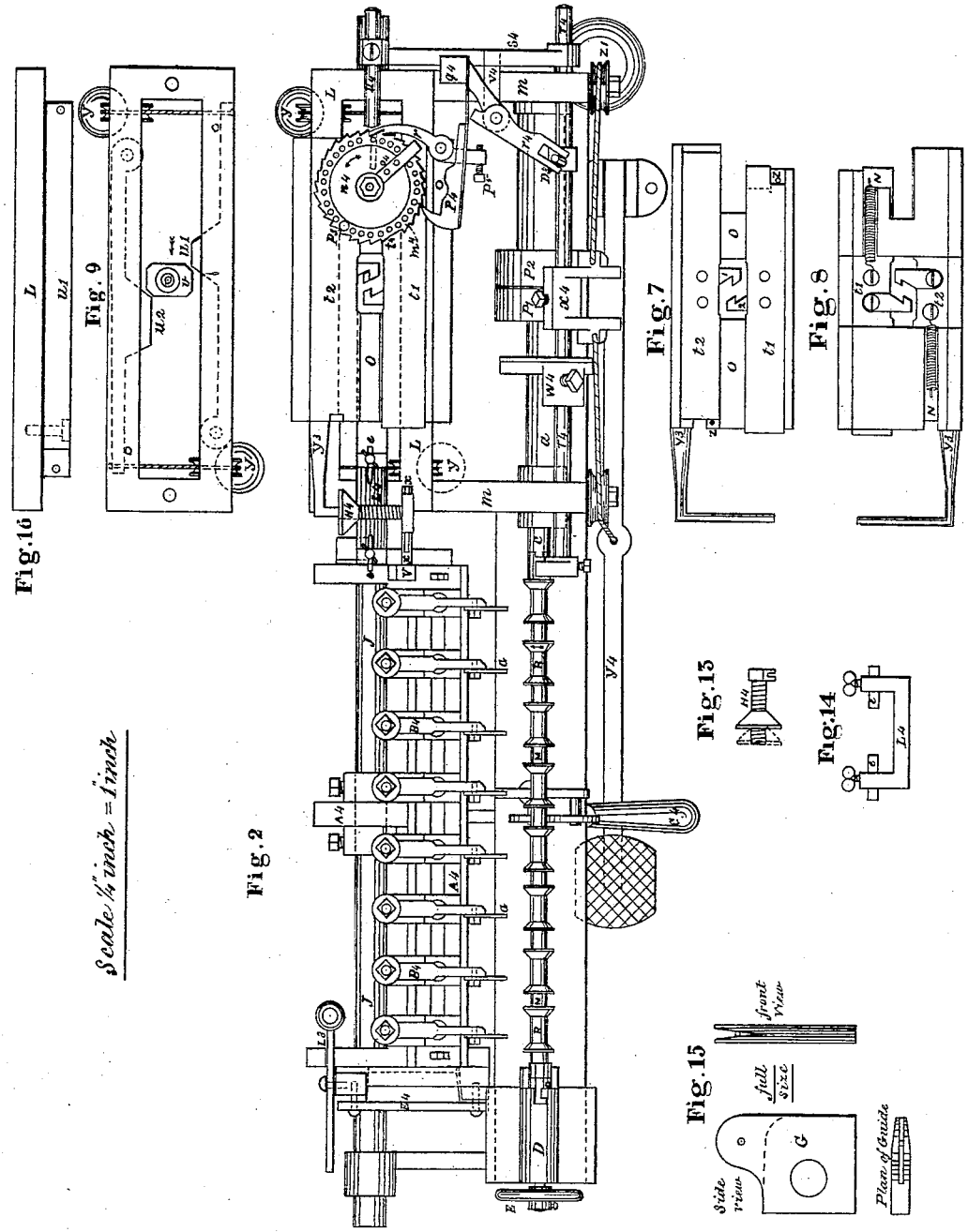
J. T. WIBBERLEY.
SPOOL-WINDING MACHINE.
No. 187,498. Patented Feb. 20, 1877.
4 Sheets—Sheet 2.

4 Sheets—Sheet 3.

J. T. WIBBERLEY.
SPOOL-WINDING MACHINE.

No. 187,498. Patented Feb. 20, 1877.

Scale ½ inch = 1 inch

Witnesses:
Abraham Manners
Wm S. Henson

Inventor:
John Thomas Wibberley

4 Sheets—Sheet 4.
J. T. WIBBERLEY.
SPOOL-WINDING MACHINE.
No. 187,498. Patented Feb. 20, 1877.
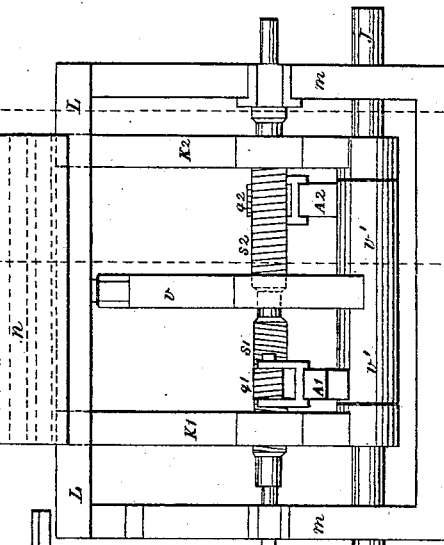
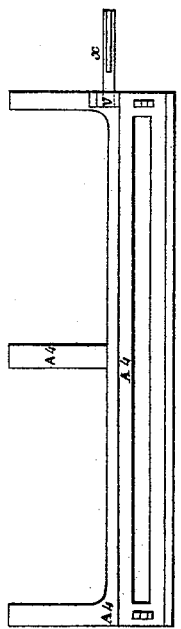
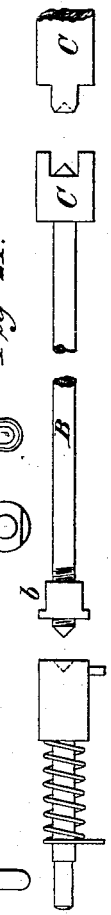
Witnesses
Abraham Manners
Wm. S. Hendon
Inventor
John Thomas Wibberley

UNITED STATES PATENT OFFICE.

JOHN T. WIBBERLEY, OF NEWARK, NEW JERSEY.

IMPROVEMENT IN SPOOL-WINDING MACHINES.

Specification forming part of Letters Patent No. 187,498, dated February 20, 1877; application filed June 22, 1876.

*To all whom it may concern:*

Be it known that I, JOHN T. WIBBERLEY, of Newark, in the county of Essex and State of New Jersey, have invented a new and useful combination of mechanism for winding silk, cotton, and other threads upon a number of reels or spools simultaneously, in a more perfect and economical manner, and with greater facilities for changing to suit the various lengths of the reels, than has hitherto been attained, which combination of mechanism is fully set forth in the following specification, reference being had to the accompanying drawings.

A patent was granted to me by the British patent-office, sealed March 9, 1875, which embraces some of the main features included in my improved and remodeled machine, for which I make the present application.

The object of my invention is to construct a spool-winding machine possessing the following advantages: First, the reciprocating and traverse motions for guiding the threads upon the reels in my machine are variable and partly self-adjusting, to suit any variation in the length or bevel of the reels, and also to give any desired length of thread upon the reels; second, the connecting-gearing between the motion of the spindle and the reciprocating movements of the guide, by the means shown and described, enables the spindles to be driven with increased speed without breaking the wheels; third, by using two spindles to each machine one spindle can be having its full reels taken off and replaced by empty ones, while the other spindle full of reels is being wound, and the spindle being held in place by a very simple device enables them to be changed very quickly, thereby saving time; fourth, my machine occupies so diminished an area of space that the bobbin-holder has to be made more compact, as shown and described.

There are four sheets of drawings, the figures of which are numbered from 1 to 21, and the letters of reference are the same in each drawing where like parts are shown.

Figure 3:
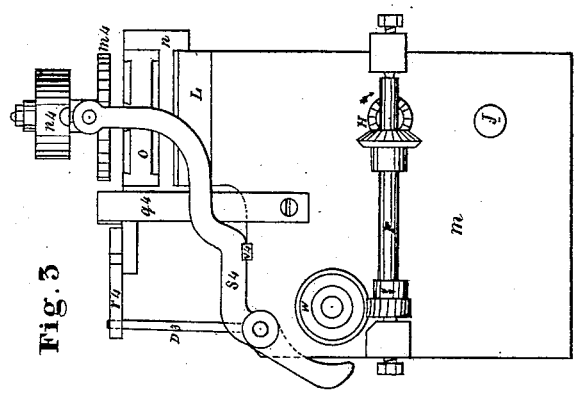
Figure 4:
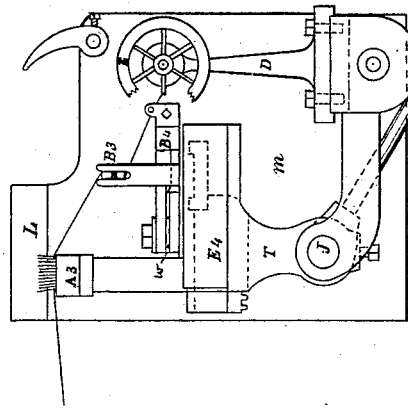

Figure 1 is a front elevation of my new machine. Fig. 2 is a plan. Fig. 3 is a right-hand end view, and Fig. 4 is a left-hand end view. Figs. 5 to 21, inclusive, represent detached skeleton and sectional views. Fig. 19 is a plan of the bobbin-holder, and Fig. 18 is an elevation of the same.

$P^1$ and $P^2$ are fast and loose pulleys driven by a belt from a pulley on a counter-shaft. (Not shown.) $P^1$ is fastened to the spindle-shaft $a$, Figs. 1, 2, 5, 6. On the left-hand end of the spindle-shaft $a$ the reel-spindle B is connected to the shaft $a$ by a coupling, C C, Figs. 1, 2, and 21, and is mounted by means of male centers at both ends. The left end of the spindle B has a nut, $b$, Figs. 2 and 21, for holding the reels tight thereon. M M are washers of suitable length to suit the reels. R R are the reels to be filled with thread. D is an upright standard containing a movable center for supporting the end of the reel-spindle, which center is operated by the hand-wheel E, Figs. 2 and 20, and held in its two different positions by a spring within the outer head of the standard D and a pin in the upper side of the center working in an angular slot, and enables the spindle to be detached and changed very rapidly. W is a worm-wheel keyed on the right-hand projecting end of the spindle-shaft $a$. This worm-wheel drives the worm-gear on the shaft below, marked F, Fig. 3, and connected by the bevel-gearing H, Fig. 3, to the right and left screw-shaft $S^1$ and $S^2$. J J, Figs. 1 and 2, is a sliding reciprocating shaft extending the whole length of the machine. To this shaft are fastened the two uprights $K^1$ $K^2$, extending through a fixed plate, L L, Figs. 9, 10, 16, on the top of the main frame $m$, and fastened to a sliding box, $n$ $n$, Figs. 3 and 17, which carries a movable plate, $o$ $o$, working in guides or recesses in $n$, and supporting at each side a slide catch and spring, $t^1$ $t^2$, Figs. 7 and 8. On the under side of the fixed plate L L are two cam-levers, $u^1$ $u^2$, Figs. 9 and 16, working on pivots, and alternately pressed outward by the opposite sides of the arm $v$, and brought back again by weights $y$ $y$ hanging over pulleys. This arm $v$ is attached to a tube, $v'$, at its lower end, through which the sliding shaft J passes, but to which shaft it is not fastened, being held in its position by two arms, $K^1$ $K^2$, and thereby traverses to and fro longitudinally with the sliding shaft J.

Figure 6:
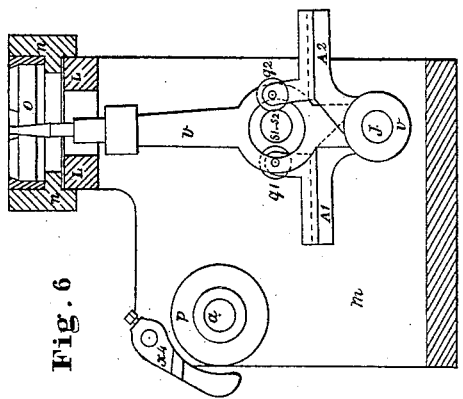

The upper end of the arm $v$ has also a rocking motion from back to front, at the end of each of which movements it is alternately held by one of the sliding catches. When this arm is moved to the right, the cam $u^1$ forces it toward the back, where it is held, and vice versa. On each end of the movable plate $o$, on opposite corners, is fixed a pin, Z, the two serving as stops for the sliding catches $t^1$ $t^2$, which sliding catches are alternately moved from their stop-pins by the action of the cam-levers upon the arm $v$, forcing its angular sides against the catches, and drawing the slides from their stop-pins. They are drawn back again alternately by the springs N N, Fig. 8, which is an inverted view of Fig. 7. Attached to the tube $v'$, Figs. 1, 6, 10, are two projecting arms, $A^1$ $A^2$. $A^1$ projects toward the front of the machine, and carries a short section of a screw, $q^1$, mounted and held from revolving by a screw-pin which gripes it fast between two upright side arms, Figs. 6 and 10. This short section has a right-handed thread cut upon it, and operates against the left-handed screw-shaft $S^1$, Fig. 10, when in gear, but in the position of the arm shown in Fig. 6 it is out of gear, and the outer one, $q^2$, in gear. By the alternate action of the screw-sections $q^1$ and $q^2$, the traverse motion is produced by the ends of the tube $v$ being forced alternately against the lower ends of the arms $K^1$ $K^2$, fastened to the sliding shaft J, and imparting to the latter its reciprocating motion. T T, Figs. 1, 4, and 10, are two upright pieces, having recesses in which the guide-frame $A^4$, Figs. 1, 10, 11, 2, slides horizontally from front to back, and vice versa, carrying with it the guide-holders $B^4$, and the guides G, Figs. 2, 4, 12, 15, the last being full size. The forward motion of this guide-frame $A^4$ is accomplished by means of the hand-lever $C^4$, and its toothed segment $D^4$ working loosely upon the sliding shaft J, and gearing into the rack $A^5$ of the guide-frame, the object being to bring the guides which guide the threads upon the reels in close contact with the reels, and pressing against them, the amount of pressure required being given by means of the friction-plate $E^4$, Fig. 2, faced with leather and pressed by means of two screws against the left-hand end of the guide-frame $A^4$, or the spring $F^4$ (shown at Fig. 12) will accomplish the same object, its pressure being adjustable by the loop-links shown. As the reels fill with the cotton they force the guides with their guide-frame backward as far as the increased diameter of the thread extends.

If it be desired to use the spring $F^4$ in place of the friction by leather, then the guide-plate is held back while changing the bobbins by the weighted latch $L^3$. On the right hand end of the guide-frame $A^4$, Figs. 1, 2, 10, and 11, is an upright arm, V, carrying a projecting piece, $x$. Attached to the sliding frame $o$ is an angular arm, $y^3$, Figs. 1, 2, 7, 8, carrying the conical tubular shaper $H^4$, consisting of a conical nut working upon a hollow adjustable screw with a sliding end, as shown at $H^4$, Figs. 1, 2, 13. The said adjustable screw has a hole through its center, and is arranged to slide upon the angular end of the arm $y^3$.

In Figs. 2, 7, 8, the screw upon which the conical nut works has at one end an angular-shaped piece with a groove, (see Fig. 13,) which slides upon the projecting piece $x$.

$L^4$, Figs. 2 and 14, is a small frame fastened to the main frame $m$ to hold the two adjustable fixed stop-pins $e$ $e$, held by thumb-screws. The measuring-wheel $m^4$, shown at Figs. 1, 2, 3, 10, mounted upon the stud $S^5$, which screws into the hole $H^5$ in the sliding box $n$, Figs. 10 and 17, has a box spring inclosed in the box $n^4$, Figs. 1, 3, 10, which box is fastened by a nut to the stud. The spring is like a watch-spring, one end of which is attached to the stationary box and the other to the hub of the measuring-wheel. This spring can be adjusted in its tension by turning the box round more or less after slackening the holding-nut $d$. The measuring-wheel has ratchet-teeth on its outer edge and a row of holes just within corresponding to each tooth. The holes are for the insertion of a pin to govern the number of layers of thread, and are numbered in consecutive order from the lifter $O^4$ around toward the left. Each hole gives two rows of winding thread, because the guides G being carried by the traverse motion from the right to the left of the reels and back again to the right, winds two rows of thread while the measuring-wheel being mounted on the stud $S^5$, attached to the sliding box $n$, being carried by the same traverse motion to the left and right, operates only one ratchet-tooth by the fixed hooked spring-pawl $P^4$, attached to the upright piece $q^4$, Figs. 2 and 3, there being a beveled place on the pawl $P^4$, against which the hub of the stop-pawl $r$ slides, and prevents more than one tooth being moved each traverse. The stop-pawl $r$, mounted on a stud screwed into the sliding box $n$, prevents the return of the wheel while moving to the right for the pawl $P^4$ to get hold of another tooth. Therefore, as there is one hole to one tooth, and it requires one motion to the left and one to the right to move one tooth of the wheel, the same motions giving each one row of thread, there must be two rows of thread to each hole.

The stop-pawl attached to the sliding box $n$ has a projecting nose-piece (shown by dotted lines) passing beneath the measuring-wheel, Fig. 2. From the near end of this pawl another short end projects, passing below the pawl $P^4$, carrying an adjusting-screw, $P^5$. The piece $q^4$ has a projecting arm at its upper end, to support the short lever $r^4$, Figs. 2 and 3, having a slot at the near end. $S^4$ is the stop-lever, attached to the stop-rod $T^4$. At the upper end of this stop-lever is an adjustable piece, $U^4$, upon which the lifter $o^4$ acts. The stop-lever has a short hooked piece, $V^4$, riveted to it and hooked over the side of the frame $m$, when running, and when the lifter $o^4$ on the measuring-wheel is ratched round to the last position by the left traverse, it will stand opposite the adjustable pin $u^4$ and, as it returns by the right traverse motion, it will run under the piece $u^4$, Fig. 1, and lift it up, together with the stop-lever $S^4$, Figs. 2 and 3, and unhook the piece $V^4$, Figs. 1, 2, and 3, when the unbalanced weight $Z'$, Fig. 2, (described hereafter,) attached to the right-hand cord, pulls the belt-shipper $x^4$, attached to the stop-rod $T^4$ and all the parts attached thereto, toward the right, and the machine instantly stops. The stop-rod $T^4$ has a brake faced with leather, $W^4$, for stopping the machine. The stop-rod $T^4$ has also the belt-shipper $x^4$ fastened on it. On the same rod is also attached a nearly upright rod, $D^3$, which operates in the forked end of the short lever $r^4$, Fig. 2. This short lever, on being carried to the right by the action of the upright piece $D^3$, attached to the stop-rod $T^4$, makes the opposite end press against the adjusting-screw $P^5$, on the near end of the stop-pawl $r$, detaching the latter from the ratchet-wheel, whereupon the box-spring immediately carries the ratchet measuring-wheel, with its registering-pin, back to the starting-point again, the pawl $P^4$ being held out of engagement with the measuring-wheel by a pin, $p^6$, set in the sliding box $n$, and operating on the irregular surface of said pawl.

There are two cords attached to the shipper, one on either side. The left-hand cord goes over a pulley to the treadle $y^4$ on the floor. The other cord passes over a pulley, and has a weight, $Z'$, attached to it, Fig. 2. A drawing of one of the guides is shown at Fig. 15, in three views. It consists of a small steel plate, the upper side of which has a groove cut, as shown, the bottom thereof corresponding to the dotted line and tapering to a very narrow cut. A small pin connects the two sides of this groove together. Each guide has a hole through it for its fastening-screw. On its front edge it has one central furrow extending from the cut to the bottom, and has other furrows the thickness of the thread apart on either side. The object of these furrows is to pack the thread uniformly upon the reels. The part of the guides which presses against the thread on the reels is the part immediately below the curved termination of the cut, and throughout the winding it maintains the same position, and therefore the thread is not liable to leave the leading furrow, as it often does with others.

The guide-holders $B^4$ are attached to other pieces immediately below them, which fit the grooved recess of the guide-plate or frame, and are held therein by bolts and nuts that pass through the slot in the guide-plate. (Vide Figs. 11 and 12.) By means of these bolts and nuts and this slot the guide-holders can readily be set nearer together and others be put in, or set farther apart and taken out to suit changes in the reels.

Figure 12:
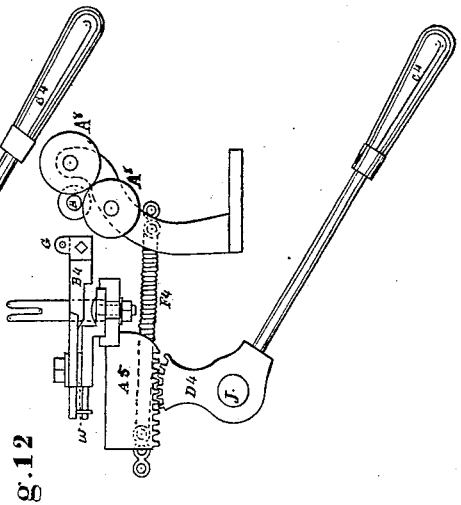

The guide-holders $B^4$ have leather washers $w$, Figs. 12 and 4, between their joints, which allow them to move with a certain amount of friction, whereby they accommodate themselves to any variations in the size of the spool or reel.

Another mode of preventing trouble from accidental variations is shown at Fig. 12, where a spring passes beneath a projecting tail of the guide-holder, the latter being allowed to move freely on its pivot. When the guide comes in contact with a shorter reel than usual, the spring enables it to give way a little, during the pressure, without injury, and upon moving away returns the guide to its original position; and it will, of course, operate at either end of the traverse.

Figs. 18 and 19 represent an elevation and plan of a bobbin-stand, consisting of a table either standing upon the floor behind the spools or attached to a base-plate common to the whole machine. This stand contains ten or any required number of pins, upon which bobbins are placed. It has radiating arms, with holes over the center of each bobbin.

Above those arms is a straight flat bar, perforated with as many holes as there are bobbins, arranged at equal distances apart, opposite to a brush on the machine, (marked $A^3$,) and parallel therewith. These radiating rods are supported by a central hub upon an upright central rod by a set-screw in any desired position. The tension-rods $B^3$, Figs. 1 and 4, are to create friction, together with the brush $A^3$, to make the threads wind tightly on the reels.

Having now described the various parts of my machine, I will describe its mode of operation, as follows:

The bobbin-stand is placed on the floor immediately behind the reels upon the machine; or it may be attached to the same base-plate which the rest of the machine stands upon, and the threads from the several bobbins are passed through the radiating rods, as shown, Fig. 19, and through the straight perforated bar at the top. From there they are passed over the brush and round the tension-rods $B^3$, and threaded through the slits in the guides below the pins. The ends are then inserted into small slits, cut with a knife, in the barrels of the reels. By pressing the foot upon the treadle-lever $y^4$, the stop-rod $T^4$ is brought toward the left end, and the stop-lever $S^4$ is now placed in the position shown in Figs. 1, 2, and 3, and the guides are brought in contact with the reels by pressing upon the hand-lever $C^4$. The hooked piece $V^4$ on the stop-lever will now be hooked over the side of the main frame $m$, and held there, and at the same time the stop-brake $W^4$ is removed from the fast pulley to the position shown, and the driving-belt is thrown by the shipper upon the fast pulley, and the winding commences. The main spindle turns the worm-wheel, and that, by the intervention of the shaft F and gearing-wheels, revolves the right-and-left screw-shaft.

In Figs. 2, 9, 10 the short section right-handed screw $q^1$ is shown in gear, and is being carried toward the left hand, together with the sliding shaft J, with its arms T T, guide-frame, guides, brush, &c., and the central lever $v$ is being carried against the cam-lever $u^2$, and presses it outward. In the meantime the conical shaper $H^4$, having been set in its position upon the screw, comes in contact with the left-hand stop $e$, which stops the top movable plate $o$ and catch-plate, but not the central arm $v$. The section-screw $q^1$, being still in gear, carries the angular upper end of the central arm $v$ out of the catch 1, and as the cam $u^2$ has been pressed back, as soon as the arm is released it is forced by the displaced weighted cam $u^2$ toward the front of the machine, and is now held by the opposite sliding spring-catch 2. The left-hand section-screw is thrown out of gear, and the right-hand section-screw thrown into gear, by which the traverse is reversed. The conical shaper next comes in contact with the right-hand stop-pin $e$, which stops the movable sliding plates on the top, and the central arm is carried against the cam-lever $u^1$, which is forced back in its turn, and as the central arm $v$ still moves toward the right it becomes disengaged from the catch 2, and the weighted cam-lever instantly forces the central arm to the back position again, and the same operation continues over and over till the reels are full; but during the process of winding the range of the traverse is increasing, for, as the reels get fuller, the guides, together with the guide-plate and the upright arm V, with the projecting piece $x$, press back the conical shaper $H^4$ till the small end of it nearly, or quite, comes in contact with the stop-pins $e$ $e$, which allows the traverse to gradually increase till the reels are full.

In order to regulate the number of layers of thread upon the reels and stop the machine when the reels are full, as each hole in the measuring-wheel gives two layers of thread, therefore, if thirty-two layers are required, for example, then the pin $p^3$ in the measuring-wheel must be placed in the sixteenth hole, as shown, Fig. 2, from the lifter $O^4$, counting in the direction indicated by the arrow. When the lifter is opposite the adjustable piece $u^4$, a blank tooth, $t^4$, is then opposite the pawl $P^4$, this tooth being cut out to prevent the wheel from being pulled round too far. Therefore, when the lifter $O^4$ gets opposite the adjustable lever $u^4$, it lifts the lever $S^4$, as described, and disengages the catch $V^4$, and the weight $Z'$ instantly throws the brake against the fast pulley, and throws the belt onto the loose pulley, carries the upright rod $D^3$ toward the right, and forces the opposite end of $r^4$ against the adjustable screw on the pawl $r$, throwing the pawl out of gear, by which the measuring-wheel is set at liberty, and is turned back by the box-spring till the pin $p^3$ is brought against the projecting nose of the stop-pawl $r$. It is then ready for the next set of reels. The guides are now thrown back by the hand-lever, and the threads are fastened to each reel into necks on their edges. A slight turn upward and pull to the left, and turn down again of the hand-wheel E, or its equivalent, and the spindle is liberated to be lifted out, and is immediately replaced by another spindle full of empty reels. Two anti-friction wheels, $A^8$, are placed in the center of the spindle to support it from springing. (Vide Figs. 12 and 2.)

Figure 5:
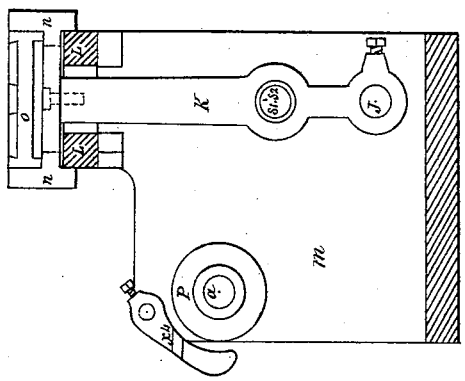

The sectional views, Figs. 5 and 6, are taken through the dotted lines, marked section 5 and section 6, respectively, in the skeleton view, Fig. 10, looking from the right.

What I claim is—

1. The guides G of the form shown, in combination with the self-adjusting guide-holders $B^4$ and slotted guide-plate $A^4$, substantially as described.

2. The combination of guide-holders $B^4$, self-adjusting, as described, with slotted guide-plate $A^4$, its rack $A^5$, recessed uprights T T, segment $D^4$, and hand-lever $C^4$, and mechanism, as shown and described, for producing a pressure of the guides upon the spools, whereby a greater or less number of guides may be employed, and a forward and backward motion of the same is produced, as set forth.

3. The combination of the spindle, mounted upon centers and having its clutch-coupling, nut, and washers for holding the reels, with the standard D, its spring center for supporting and detaching the end of the spindle, and the supporting anti-friction wheels, mounted as shown, and all operating as and for the purpose set forth.

4. The combination of cam-levers $U^1$ $U^2$, having their weights, cords, and pulleys, sliding box $n$, and sliding plate O, having the angular arm $Y^3$, sliding catches $t^1$ $t^2$, their springs and pins, screw-shaft $S^1$ $S^2$, traversing-shaft J, carrying the rocking arm $v$, and the engaging parts $q^1$ $q^2$, adjustable shaper-nut $H^4$, its hollow adjusting-screw, having its angular sliding piece, holder $L^4$, having stop-pins $e$ $e$, guide-plate $A^4$, having the projecting slide X upon the upright arm V, attached to and moving with it, all as and for the purpose set forth.

5. The combination of measuring-wheel $M^4$, having its ratchet-teeth, pin-holes, pin and lifter $O^4$, the spring and spring-box $n^4$, the stop-pawl $r$, and its adjusting-screw $P^5$, and its projecting nose-stop for pin, all mounted on sliding box $n$, hooked spring-pawl $P^4$, attached to upright $q^4$, adjustable piece $u^4$, stop-lever $S^4$, hooked piece $v^4$, upright rod $D^3$, forked lever $r^4$, mounted on support projecting from $q^4$, brake $w^4$, shipper $X^4$, treadle $Y^4$, weight $Z'$, and connecting-cords, all as and for the purpose set forth.

6. The combination of the pulley-shaft $a$, its clutch on the left end for driving the reel-spindle B, its fast and loose pulleys, its worm $w$, with the worm-wheel and shaft F, and the bevel-wheels for driving the screw-shaft, for the purposes specified.

7. The combination of the bobbin-stand, its central upright rod, its adjustable radiating rods, and perforated top bar with the winding portion of the machine, as described, forming, as a whole, a new compact and complete reel or spool winding machine, for the purposes described and specified.

JOHN THOMAS WIBBERLEY.

Witnesses:
ABRAHAM MANNERS,
WM. S. HENSON.